Figure 1:
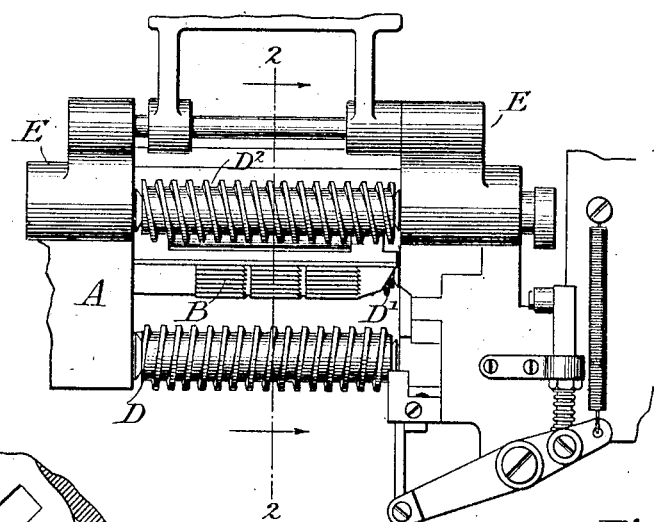

R. G. CLARK.
LINE CASTING MACHINE.
APPLICATION FILED DEC. 10, 1908.

925,753.

Patented June 22, 1909.

WITNESSES:

INVENTOR
R. G. Clark
BY
ATTORNEY

UNITED STATES PATENT OFFICE.

ROBERT G. CLARK, OF BROOKLYN, NEW YORK, ASSIGNOR TO MERGENTHALER LINOTYPE COMPANY, A CORPORATION OF NEW YORK.

LINE-CASTING MACHINE.

No. 925,753.  Specification of Letters Patent.  Patented June 22, 1909.

Application filed December 10, 1908. Serial No. 466,814.

*To all whom it may concern:*

Be it known that I, ROBERT G. CLARK, of the borough of Brooklyn, county of Kings, and State of New York, have invented a new and useful Improvement in Line-Casting Machines, of which the following is a specification.

This invention relates to that class of matrix distributing or sorting mechanisms shown in Letters Patent of the United States No. 347,629. The matrices with which these mechanisms are intended to deal are provided at the upper end with a series of suspending and distributing teeth, the matrices for a given character having a number or arrangement of teeth differing from those of matrices containing any other character. The distributer consists of a horizontal bar provided with longitudinal teeth so grouped or arranged that each matrix carried along the bar is sustained by the interlocking teeth until it arrives at the point where it is to be discharged, when for the first time the teeth bear such relations that the matrix is released. The matrices are commonly carried along the bar by adjacent parallel screws which engage their vertical edges.

In practice it is frequently desirable, for one reason or another—for example when a matrix is reversed on the bar, or when it stands with one edge in advance of the other—to speedily remove the matrices from the bar.

Heretofore it has been necessary to permit the passage of the matrices along the bar under the influence of the carrier devices until they arrive at the usual point of release; and this operation was frequently attended by much loss of time. In order to overcome this difficulty and permit the instantaneous removal of the matrices I now mount the distributer bar and screws so that they may be separated laterally in order to disengage the matrices from the feed screws while they remain on the bar, so that they may be moved instantly along the bar and off from its end, or an individual matrix moved instantly along the bar until it reaches the point of release. I mount the bar so that it may be swung or moved laterally at the lower edge from its operative position and away from the feed screw or screws on one side, and I mount the screw or screws on the other side so that they may be separated from the bar.

The essence of the invention lies in mounting the bar so that it may be moved laterally from its operative position away from the carrying devices in order to permit the free removal of the matrices.

In the drawings I have shown my invention incorporated in a short distributer designed to separate the matrixes of different fonts according to font, but it is obvious that the same principle may be applied to the longer distributers, well known in the art, for delivering the matrices of a font or alphabet to the various channels of the magazines in which they are to be carried.

Figure 2:
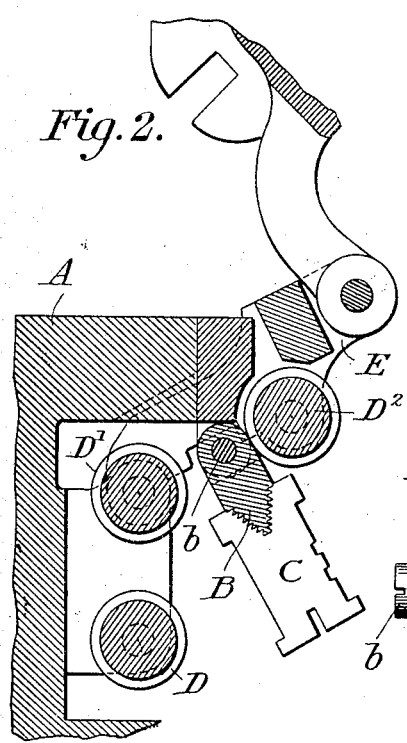
Figure 3:
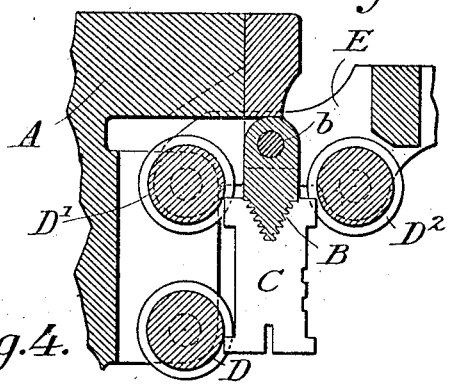
Figure 4:
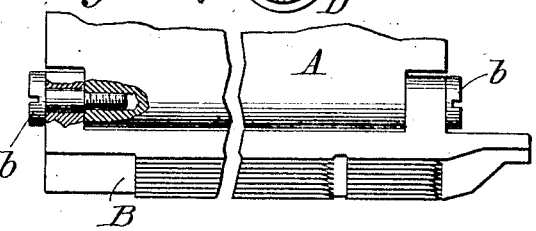

In the drawings: Figure 1 is a side elevation of my distributing mechanism with portions broken away to show the internal construction. Fig. 2 is a vertical cross-section on the line 2—2, with one of the feed screws and the distributer bar moved from their normal positions to permit the speedy removal of the matrices. Fig. 3 is a section on the same line as Fig. 2 with the parts in their operative positions. Fig. 4 is a side view of the distributer bar and its support, one end being broken away to show the supporting pivot.

Referring to the drawings, A represents a portion of the stationary framework, which may be of any suitable form and construction.

B is the horizontal distributer bar, having its lower edge of V form in cross-section, and with longitudinal teeth thereon for the purpose of suspending the individual matrices, C, as they are advanced along the bar, and releasing them at the proper points. These teeth may be varied in form and arrangement at will, provided only that they are adapted to engage the corresponding teeth of the matrices in a manner well understood by those familiar with the art.

The matrices are of a form well known in connection with Mergenthaler machines, each having in its upper edge a V shaped notch with teeth in the two edges, these teeth being varied in number or arrangement according to the characters borne by the respective matrices.

D, D' are two horizontal screws lying parallel with the distributer bar in position to engage the upper and lower edges of the passing matrices on one edge. $D^2$ is a third screw arranged to engage the opposite edge of the matrices. These screws correspond to those commonly used in Mergenthaler machines, and serve only to force the matrices one after another along the distributer bar until they arrive at the points of release, when the matrices fall clear of the screws and the bar by gravity.

So far as described the parts may be of ordinary construction and mode of operation. Instead, however, of securing the distributer bar rigidly in place, as heretofore, I now mount its ends on horizontal pivots, $b$, seated in the main-frame, or other support, the arrangement being such that when desired the lower operative edge of the bar may be swung laterally around the pivots, carrying with it the matrices suspended thereon, so that their ears will be disengaged from the screws D and D', as shown in Fig. 2.

The screw $D^2$ is mounted at its ends on supporting arms, E, arranged to swing about the axis of the screw D' as a center, so that the screw $D^2$ may be swung upward from the operative position shown in Fig. 3 in engagement with the matrix, to the inoperative position shown in Fig. 2, out of engagement with the matrix.

It will be perceived that by first swinging the screw $D^2$ upward away from the matrices and thereafter swinging the distributer bar sidewise as shown in Fig. 2 to carry the matrices clear of the screws, D, D', the matrices are left wholly free from the propelling screws, so that they may be moved freely and rapidly along the distributer bar by hand in either direction, and removed in groups from either end of the bar, or individually removed at the points where the teeth will disengage.

I believe it to be wholly new in the art to mount the distributer bar so that it may be moved laterally to disengage the suspended matrices from the feed screws on one side, and also new to combine with parts arranged as above a third screw so mounted that it may be moved at will out of engagement with the matrices.

It will be manifest to the skilled mechanic that the details may be widely modified without changing the mode of action.

Having described my invention, what I claim and desire to secure by Letters Patent, is:

1. In combination, a distributer bar hinged to swing sidewise, feed screws fixed in position to engage the matrices at one edge, and a screw, movable at will to engage the matrices at the opposite edge.

2. In combination with the distributer bar hinged to swing sidewise from its operative position, and a fixed feed screw at one side of the bar, a screw at the opposite side of the bar, and swinging supports for the last named screw; whereby matrices suspended from the bar may be disengaged from the screws and exposed endwise to facilitate their removal from the bar.

3. In combination with means for carrying matrices along the same, the toothed distributer bar hinged to swing sidewise from its operative position independently of the carrying means.

4. In a distributing mechanism, feed screws and an intermediate distributer bar, mounted for horizontal separation at will substantially as described.

5. In a matrix distributing mechanism, a distributing bar and matrix feeding devices located on opposite sides of the bar, the bar being hinged to swing laterally from its operative position at the lower edge, and the feeding devices being separable in a direction transverse to the bar; whereby the matrices may be carried clear of the underlying magazine and disengaged from the feeding devices while remaining in engagement with the bar, preparatory to their removal therefrom by hand.

In testimony whereof I hereunto set my hand this seventh day of December, 1908, in the presence of two attesting witnesses.

ROBERT G. CLARK.

Witnesses:
JOHN R. ROGERS,
LUCY E. SMITH.